United States Patent [19]

Stupakis

[11] Patent Number: 4,843,250

[45] Date of Patent: Jun. 27, 1989

[54] WAVE ACTION POWER GENERATOR

[75] Inventor: John S. Stupakis, Orange, Calif.

[73] Assignee: JSS Scientific Corporation, Orange, Calif.

[21] Appl. No.: 266,696

[22] Filed: Nov. 3, 1988

[51] Int. Cl.[4] ............................................. F03B 13/12
[52] U.S. Cl. .................................... 290/53; 417/331; 60/497
[58] Field of Search .................... 290/42, 53; 417/330, 417/331, 332; 60/497, 501

[56] References Cited

U.S. PATENT DOCUMENTS

| 3,231,749 | 1/1966 | Hinck III | 290/53 |
|---|---|---|---|
| 3,603,804 | 9/1971 | Casey | 417/332 X |
| 3,758,788 | 9/1973 | Richeson | 290/42 |
| 4,009,396 | 2/1977 | Mattera et al. | 290/53 |
| 4,204,406 | 5/1980 | Hopfe | 417/331 X |
| 4,266,143 | 5/1981 | Ng | 290/53 |
| 4,317,047 | 2/1982 | de Almada | 290/53 |
| 4,340,821 | 7/1982 | Slonim | 290/53 |
| 4,389,843 | 6/1983 | Lamberti | 60/507 |
| 4,423,334 | 12/1983 | Jacobi et al. | 290/53 |
| 4,438,343 | 3/1984 | Marken | 290/53 |
| 4,454,429 | 6/1984 | Buonome | 290/53 |
| 4,492,875 | 1/1985 | Rowe | 290/53 |

Primary Examiner—William M. Shoop, Jr.
Assistant Examiner—W. E. Duncanson, Jr.
Attorney, Agent, or Firm—Gausewitz, Carr & Rothenberg

[57] ABSTRACT

A power generating apparatus including a watertight sealed buoyant vessel of cylindrical form having an external stabilizer for directing the vessel into the current. Internally, the vessel is provided with a supporting structure on the axial centerline for rotatably supporting the axle or pivot shaft of a lever arm having a weight at the end thereof, the weight being supported on a circumferential rail assembly adjacent the upper end of the vessel. The weight is freely rotatable in either direction thorough 360 degrees. The lower end of the shaft is coupled to a piston type hydraulic pump, which draws fluid from a reservoir, and pressurizes the fluid into a two stage accumulator, the controllable flow therefrom actuating a hydraulic motor coupled to an electrical generator, Fluid from the hydraulic motor then returns to the reservoir for further usage.

19 Claims, 2 Drawing Sheets

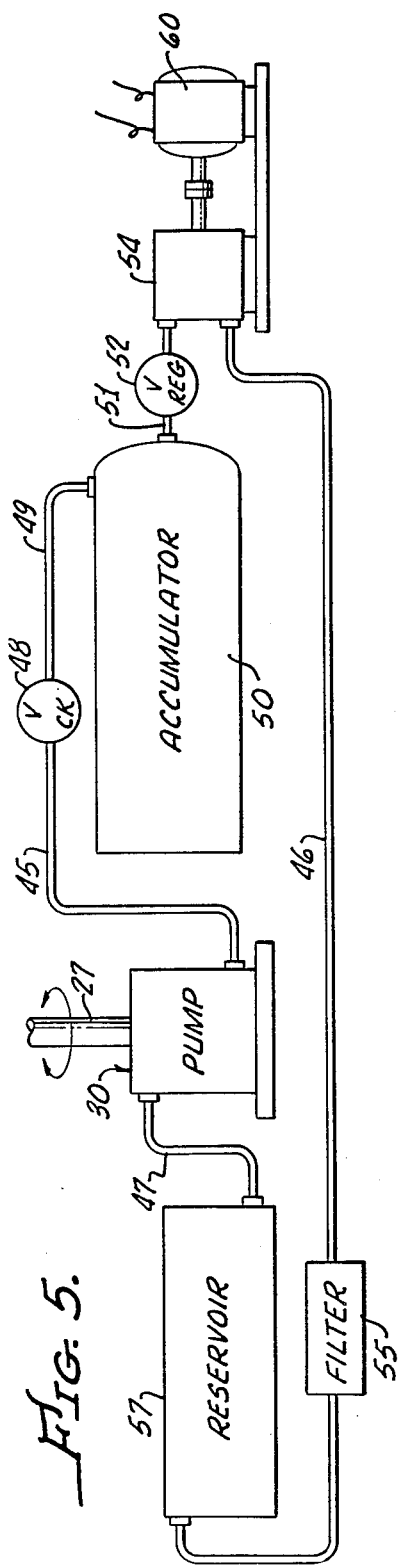
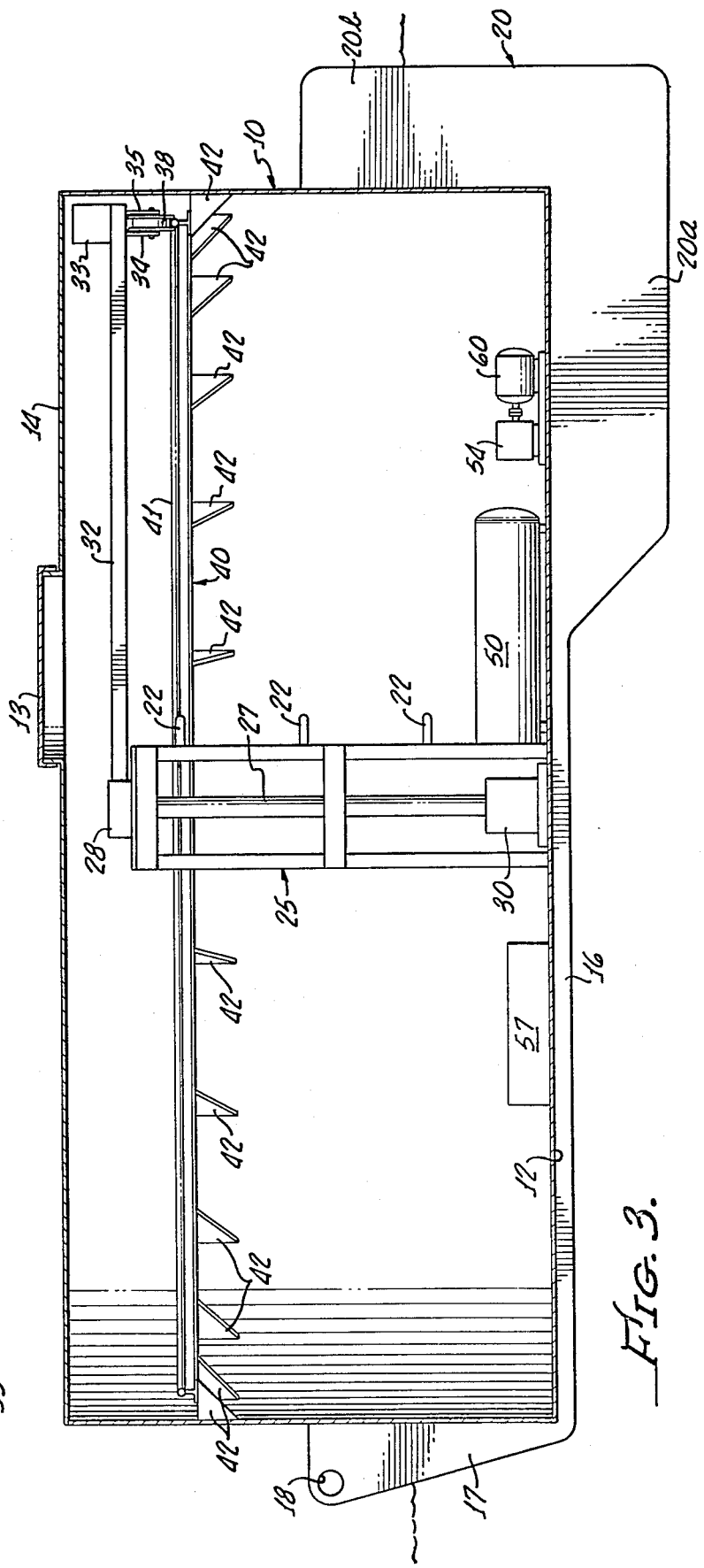

WAVE ACTION POWER GENERATOR

BACKGROUND OF THE INVENTION

The background of the invention will be discussed in two parts.

2. Field of the Invention

This invention relates to electrical power generators, and more particularly to an electrical power generator deriving its motive force by means of wave or tidal action.

2. Description of the Prior Art

The generation of power from tidal or wave action has been an objective of man for decades. Various forms of methods and apparatus have been developed for accomplishing such power generation.

One such prior art power generation device is shown and described in U.S. Pat. No. 3,231,749, entitled "Wave Power Generator", which issued to Hinck III on Jan. 25, 1966, the apparatus including a buoyant housing, such as a buoy, which has mounted therein a freely oscillatable or rotatable pendulum like member which is constrained to move in a plane perpendicular to the vertical axis of the buoy during rocking by wave motion to drive an alternator or generator connected adjacent the weighted end of the pendulum.

Another such apparatus is disclosed in U.S. Pat. No. 3,758,788, entitled "Conversion System for Providing Useful Energy from Water Surface Motion", which issued to Richeson on Sep. 11, 1973, the apparatus including a plurality of like configured buoyant structures interconnected in a matrix by bellows, actuated upon displacement to develop positive fluid pressures for driving a turbine or the like.

Another such apparatus is disclosed in U.S. Pat. No. 4,009,396, entitled "Wave Operated Power Plant", such patent issuing on Feb. 22, 1977 to Mattera et al. The apparatus includes a buoyant vessel partially filled with water therein, with movement of the enclosed water during wave action operating against turbines to effect rotation thereof, the shafts of the turbines being coupled to operate electrical generators.

Another such apparatus is disclosed in U.S. Pat. No. 4,266,143, entitled "Apparatus for Producing Electrical Energy From Ocean Waves", which issued to Ng on May 5, 1981, such patent disclosing a buoyant cylindrical vessel tethered beneath the vertical axis thereof, the interior being divided by horizontal platforms, with each platform supporting a gravity wheel unidirectionally rotatable on rocking movement of the vessel. In one embodiment, four gravity wheels are shown, with each operating its own generator, with one pair of gravity wheels operated in one direction of rotation and the other pair in the opposite direction of rotation. In a second embodiment, four unidirectionally rotatable gravity wheels and two generators are employed.

Another system is shown and described in U.S. Pat. No. 4,317,047, entitled "Energy Harnessing Apparatus", which issued to de Almada on Feb. 23, 1982, the apparatus including a buoyant structure supporting a second conically arranged framework structure therein, with a pendulum having its pivot point at the apex of the cone, the suspended weight of the pendulum being free to swing in a plurality of planes. A plurality of hydraulic cylinder units interconnect the arm of the pendulum and the framework at uniform angular positions about the circumference of the cone near the upper ends to generate fluid pressure in response to swinging of the pendulum, with the pressure then used to drive a hydraulic motor, which, in turn operates a generator.

Another such system is shown in U.S. Pat. No. 4,340,821, entitled "Apparatus for Harnessing Wave Energy", which patent issued to Slonim on July 20, 1982. The apparatus includes a buoyant framework having a plurality of pivotal flaps of different configuration and at different elevations relative to the framework, the flaps pivoting in response to waves impacting therewith to generate motive force for operation of pumps. The apparatus also includes pivotable weights.

Another system is shown and described in U.S. Pat. No. 4,389,843, entitled "Water Wave Energy Transducer", which issued to Lamberti on June 28, 1983, and discloses a buoyant housing having a plurality of arms pivoted outwardly therefrom, with each arm having a float attached thereto, rocking of the arms operating drive sprockets at the pivot axes thereof, which sprockets are connected to chain drives extending into the housing and operative through a unidirectional gear train to drive an electrical generator.

Another pendulum operated system is disclosed in U.S. Pat. No. 4,423,334, entitled "Wave Motion Electric Generator", which patent issued to Jacobi et al on Dec. 27, 1983. The apparatus includes a spherical buoyant housing having a horizontal platform with an inverted pendulum supported at the center of the sphere, with first and second oppositely directed coils on the free end of the pendulum. On pivoting of the pendulum, the coils pass through first and second magnetic devices at opposite ends of the arc defined by movement of the pendulum, to thus generate electricity.

Another wave powered system is disclosed in U.S. Pat. No. 4,438,343, entitled "Wave Power Generator", which patent issued to Marken On Mar. 20, 1984. The apparatus includes a housing mounted within a boat, with the housing supporting first and second pendulums pivotable on a common axis, each of which drives its pivot shaft unidirectionally, through a differential arrangement to provide unidirectional movement to a vertical output shaft. The output shaft stores energy in a spring, which through a pawl and ratchet similar to a clock mechanism, provides uniform speed of rotation to an electrical generator shaft.

Another system is disclosed in U.S. Pat. No. 4,454,429, entitled "Method of Converting Ocean Wave Action into Electrical Energy", which patent issued to Buonome on June 12, 1984, the system utilizing a line of spaced fixed concrete piers configured for acting as wave magnifiers, with wave action of water flowing between the piers actuating floats positioned therebetween.

In accordance with an aspect of the invention, it is accordingly an object of the invention to provide a new and improved method and apparatus for utilizing wave or tidal action for generation of electrical power.

SUMMARY OF THE INVENTION

The foregoing and other objects of the invention are accomplished by providing a watertight sealed buoyant vessel of cylindrical form having an external stabilizer for directing the vessel into the current. Internally, the vessel is provided with a supporting structure on the axial centerline for rotatably supporting the axle or pivot shaft of a lever arm having a weight at the end thereof, the weight being supported on a circumferential rail assembly adjacent the upper end of the vessel. The weight is freely rotatable in either direction through 360 degrees. The lower end of the shaft is coupled to a piston type hydraulic pump, which draws fluid from a reservoir, and pressurizes the fluid into a two stage accumulator, the controllable flow therefrom actuating a hydraulic motor coupled to an electrical generator. Fluid from the hydraulic motor then returns to the reservoir for further usage.

Other objects, features and advantages of the invention will become readily apparent from a reading of the specification, when taken in conjunction with the drawings, in which like reference numerals refer to like elements in the several views.

BRIEF DESCRIPTION OF THE DRAWINGS

FIG. 3 is a side elevational view of the wave power generating apparatus, with the buoyant vessel shown in cross-section as viewed generally along line 3—3 of FIG. 1;

FIG. 5 is a diagrammatic view of the closed loop hydraulic system and electrical power generator used in the apparatus of FIG. 3.

DESCRIPTION OF THE PREFERRED EMBODIMENT

Figure 1:
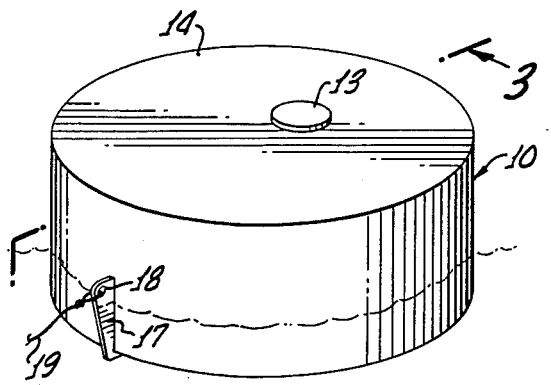
FIG. 1 is a top front perspective view of the buoyant vessel for the wave action power generating apparatus according to the invention.
Figure 2:
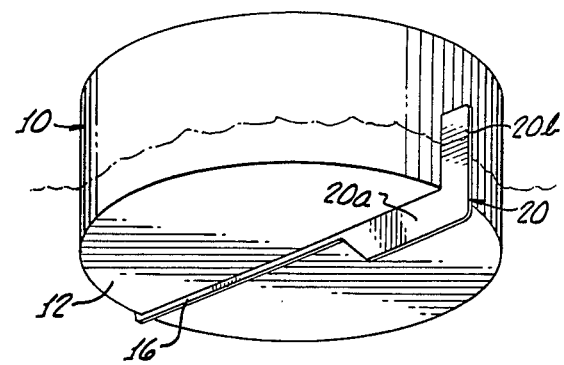
FIG. 2 is a bottom rear perspective view of the buoyant vessel of FIG. 1.

Referring now to the drawings, and particularly to FIGS. 1 and 2, there is shown a housing in the form of a cylindrically configured watertight buoyant vessel, generally designated 10, which includes a lower surface 12, and an upper surface 14 generally parallel to the lower surface 12. Dimensionally, and by way of example only, the vessel may have a diameter of fifteen feet and a height of about six feet. Formed in the upper surface 14 is a manhole access opening with a manhole access cover 13 to permit access to the interior of the vessel 10. The cover 13 is offset from the center of the cylindrical vessel 10.

Secured to the lower surface 12 is a diametrically extending keel or stiffener member 16 formed of plate steel affixed, such as by welding, to the surface 12 with the member 16 perpendicular to the plane of the surface 12. At the forward end of member 16, there is an additional generally triangular mooring plate portion 17 coplanar therewith, the mooring plate portion being affixed to the side of the vessel 10 and extending along a line generally perpendicular to the axis of the stiffener member 16. The upper end of the mooring plate portion 17 is provided with an opening 18 for receiving a mooring line or chain 19, only a portion of which is shown.

The vessel 10 is thus free to float through three hundred sixty degrees about the mooring line 19. In order to maintain the vessel 10 into the waves or tidal current, the aft portion of the vessel 10 is provided with a fixed rudder or stabilizer 20, which is formed from a generally L-shaped piece of plate steel, the stabilizer 20 having a first portion 20a coplanar with the stiffener member 16 and a second portion 20b extending upwardly and affixed to the side of the vessel 10. The stiffener 16, the stabilizer 10 and the mooring plate portion 17 are coplanar through a plane that includes the vertical axis of the vessel 10. As shown, the dimensions of the stabilizer 20 are much greater than the dimensions of the stiffener member 16. By way of example, the stiffener 16 may be formed of three-quarter inch plate steel having a depending depth of four or five inches, while the stabilizer 20 is likewise formed of three-quarter inch plate steel and protrudes about eighteen inches down and aft of the vessel 10. Similarly, the mooring plate portion 17 is formed of three-quarter inch plate steel and protrudes about twelve inches out from the front of the vessel 10. With the stiffener 16, the stabilizer 20 and the mooring plate portion 17, the vessel 10 is strengthened at the bottom and two diametrically opposing sides.

Referring now to FIG. 3, the interior of the vessel 10 is shown, with the interior structure including a centrally disposed vertically arranged supporting framework or pylon 25 formed of angle iron or the like, with the center of the pylon 25 on the cylindrical axis of the vessel 10. A plurality of spaced access steps 22 are affixed, such as by welding, to the pylon 25 to provide a ladder in alignment with the manhole access cover 13 for ready access to the interior by a technician or repairman.

Rotatably supported on this cylindrical axis of pylon 25 is a shaft 27. On the upper end of pylon 25, which terminates in proximity to the under side of the upper surface 14, there is a radial thrust ball bearing assembly 28 for support of the upper end of the shaft 27. The lower end of shaft 27 is coupled as an input to a hydraulic piston pump 30 secured within the lower framework of the pylon 25.

Figure 4:
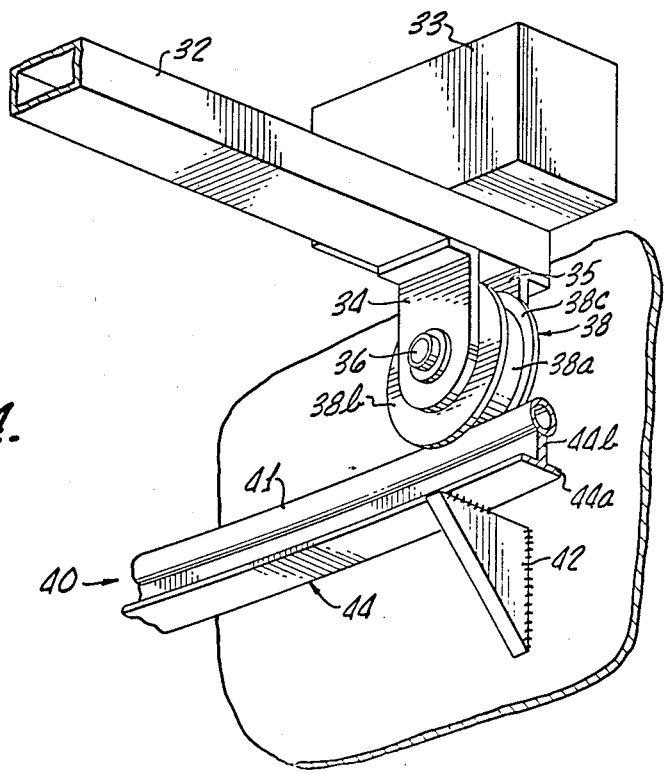
FIG. 4 is an enlarged fragmentary perspective view of the weight and rail assembly of the apparatus shown in FIG. 3.

Referring also to FIG. 4, the shaft 27 is coupled to a right angularly extending arm 32 having a weight 33 at the free end thereof. As shown in FIG. 4, the arm is formed as a tubular box-like metal beam, with the weight 33 affixed, such as by welding, to the upper surface thereof. The weight 33 is of a regular cubical configuration, and is affixed to the end of arm 32 so that it is balance or centered, in the horizontal plane, with respect to the axial centerline of the beam or arm 32. The lower surface of the free end of arm 32 is provided with a pair of depending spaced, generally parallel L-shaped wheel supports 34, 35 which have the short arm thereof attached to the beam 32, such as by welding. The lower ends of the supports 34, 35 have openings therethrough for rotatably supporting the axle 36 of a wheel 38. The wheel 38 is provided with a reduced diameter central portion 38a, with larger diameter outer flange portions 38b, 38c, the width of the central portion 38a being sufficient for riding on a rail member 41 of a rail assembly, generally designated 40. As shown in FIG. 3, to minimize rolling friction between the wheel 38 and the rail member 41, the center of the rail member 41 is in general alignment with the center of mass, or center gravity, of the weight 33 with the vessel 10 in a horizontal (unrocked) position. In addition, the center of gravity or center of mass of the weight 33 passes through the center of the axle 36 of the wheel 38, thus concentrating the impact of the weight 33 on the rail 41 at the point of contact between the rail 41 and the central portion 38a of the wheel 38. To further minimize rolling friction, with a tubular rail member 41 and a nonconforming configuration of the central portion 38a, the actual contact area is very small. The flange portions 38b and 38c of the wheel 38 provide lateral support with minimum or no contact with the rail 41.

The rail assembly 40 includes a plurality of gussets 42 of right triangular configuration, with a first side secured, such as by welding, to the inner surface of the vessel 10, with each gusset 42 extending in a radial direction from the inner wall toward the center of the vessel. The sides of the gussets 42 perpendicular to the welded side then define a common plane, which is generally perpendicular to the shaft 25 and parallel to the upper and lower surfaces 12 and 14 of vessel 10.

Attached to these upper sides of gussets 42 is the cross bar portion 44a of an inverted T-shaped beam member 44 which, in a horizontal plane, defines a circle coaxial with the outer wall of the vessel 10. The upwardly extending leg portion 44b of the beam member 44 is secured, such as by welding, to the rail 41. As shown, the rail 41 is a cylindrical tubular member on which the wheel 38 rides, with the reduced diameter portion 38a of wheel 38 having a very small point of contact with the rail 41, thus providing a minimum amount of frictional resistance during pivoting or rotation of the assembly including weight 33.

In operation, the vessel 10 is constantly being directed into the wave or tidal current by virtue of the keel or stiffener 16 and rudder or stabilizer 20. With any wave or tidal current movement, the vessel 10 will rock, pitch and roll. During this rocking, pitching or rolling, the weight 33 will traverse an arc or a circle in one or both directions. With each movement of the weight 33, the arcuate or circular motion will be imparted to the vertically arranged shaft 27 which, in turn will drive the piston type hydraulic pump 30.

To obtain maximum transfer of energy from the wave or tidal action, by reference to FIG. 3, it can be seen that the placement of the rail assembly 40 relative to the uppermost pat of the interior of the vessel is such that the upper surface of the weight 10 rotates in a plane in close proximate relation to the cover of the adjacent upper surface 14 of the vessel 10. With the placement of the weight 33 at the higher elevation within the vessel 10, and placement of other components on the bottom surface provides a weight distribution which, in effect, causes the vessel 10 to move in synchronism with the wave or tidal action, thus imparting maximum transfer of wave energy to weight movement energy.

Figure 6:
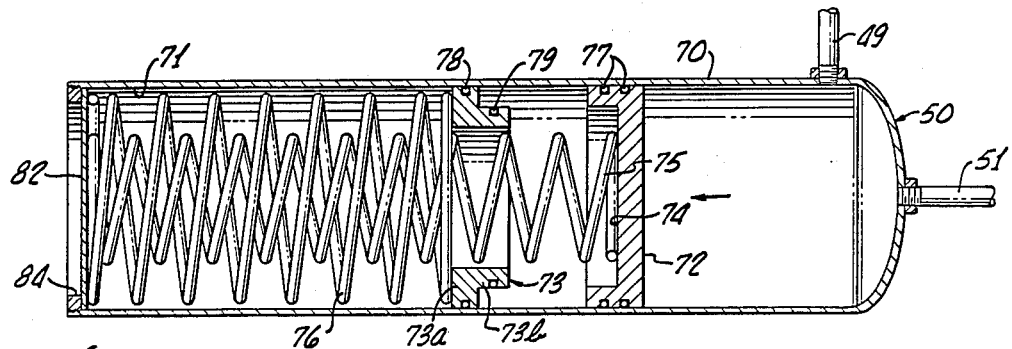
FIG. 6 is a partially cross-sectional view of the two stage accumulator used in the apparatus of FIG. 3, and shown diagrammatically in FIG. 5.

Referring now to FIGS. 3, 5 and 6, the details of the balance of the power generating system will be described. FIG. 5 shows, in diagrammatic form, the hydraulic system and the motive means for the electrical power generator. Briefly, the system includes the pump 30, a check valve 48, an accumulator 50, a pressure regulator valve 52, a hydraulic motor 54, a filter 55 and a sump or reservoir 57. The hydraulic motor is connected for operation of an electrical power generator 60.

In operation, fluid pressurized by the pump 30 is passed through line 45 and through a series connected check valve 48 which permits fluid flow in only one direction, that is from the hydraulic pump 30 through line 45, check valve 48 and line 49 to the accumulator 50. Fluid from the hydraulic accumulator 50 passes out through line 51 through the pressure regulator valve 52 for control of the speed of rotation of the hydraulic motor 54. Rotation of the motor 54, in turn operates the electrical power generator 60. Fluid expended from the hydraulic motor 54 then passes through line 46, through filter 55 to reservoir 57, from whence it may be reutilized by pump 30 via line 47 interconnecting reservoir 57 and pump 30.

The physical locations of the reservoir 57, accumulator 50, hydraulic motor 54 and electrical power generator 60 are depicted in FIG. 3, wherein these components of the system are secured to the floor 12 of the vessel 10. These components are at positions selected for weight distribution about the vertical axis of the vessel 10.

The internal details of the hydraulic accumulator 50 are shown in FIG. 6. The accumulator 50 is a two-stage accumulator as will now be described. The housing for the accumulator 50 is in the form of a pressure tank 70 of circular cross-section, arranged for horizontal positioning, and having an open end 71. First and second pistons 72 and 73 are received within the tank 70, along with first and second spring members 75 and 76. The pistons 72 is the first stage piston, and is of circular cross-section approximating the internal diameter of tank 70. The piston 72 is solid, that is, it is of a solid disk shape with a cup-shaped recess 74 formed on the underside thereof. The periphery is provided with sealing or compression rings 77 fitted within annular recesses.

The second stage piston 73 is of annular configuration, with an outer diameter generally equal to the inner diameter of the tank 70, with a pressure ring 78 fitted within annular recesses about the periphery thereof for sealing, sliding engagement with the sidewall of tank 70. As depicted in FIG. 6, the piston 73 is formed with first and second concentric portions 73a and 73b, with a central opening 80. The portion 73a is the outer part having the same diameter as the inner diameter of the tank 70. The portion 73b is a reduced diameter shoulder portion, the outer diameter of which is generally the same as the inner diameter of the cup-shaped recess 74 of the first stage piston 72. In operation, the shoulder portion 73b is configured for being received within the recess 74, with pressure ring 79 fitted within an annular recess about the periphery of portion 73b.

The first and second stage spring members 75 and 76 are of different diameters and lengths, for being fitted one within the other in a non-interfering manner. First stage spring 73 is configured and dimensioned for having one end thereof abutting against the planar surface of recess 74 of piston 72. The other end abuts against a bulkhead 82 which, in conjunction with a retaining ring member 84, closes the open end 71 of tank 70. The spring member 75 thus urges the first stage piston to the right, as viewed in FIG. 6. The second stage spring member 76 is of a larger diameter, slightly less than the inner diameter of the tank 70, and of a shorter length than spring member 75. The spring member 76 encircles the first stage spring member 75, with one end abutting against the bulkhead 82 and the other end abutting against the facing surface of the portion 73a of second stage piston 73. As shown in FIG. 6, the relative lengths of the two spring members 75 and 76 are such that, in operation, as fluid enters through inlet line 49, pressure of the fluid urges against the head of first stage piston 72, until after a predetermined length of travel, the recess 74 thereof passes over the shoulder portion 73b of second stage piston 73. With an additional increment of travel, in the direction of the arrow within tank 70, the leftmost edge of piston 72 engages the planar edge portion of piston 73, after which both pistons move simultaneously, against the combined force of the two spring members 75, 76, thus producing additional resistance to the pressure of the incoming fluid through line 49.

In operation of the system, the vessel 10 is anchored in the sea or ocean, and moves about this anchor in a manner controlled by tidal or current conditions. As the vessel 10 undulates or bobs with the current or tide, the weight 33 at the end of arm 32 pivots or rotates about the axial centerline of the vessel 10 on the rail member 41 of the fixed rail assembly 40. This pivotal or rotary motion is transmitted, via shaft 27 connected to the arm 32, to energize the hydraulic pump 30. With this arrangement, the actuating elements of the system are simple, and uncomplicated, with the bulk of the weight at the bottom of the vessel 10 and on the axial centerline (the pylon structure 25), with the rail supported weight adjacent the upper part of the vessel 10 for maximum effect from wave or current movement.

The configuration of the vessel 10, that is, cylindrical, provides an economically configured buoyant housing, of regular geometric configuration, with a balanced weight distribution within the vessel 10, along with the rudder or stabilizer 20 permitting the vessel 10 optimally to follow wave and current action, With hydraulic pump 30, actuable in either direction of travel of the shaft 27, virtually all movement of the waves or currents are transferred into useful work. The two stage accumulator 50 enables optimum use of the hydraulic pressure generated by the pump 30, to efficiently control the hydraulic motor 54 which, in turn, drives the electrical power generator 60. Thus, the system herein described is economically fabricated, using conventional assembly techniques, with readily available part and materials, to provide a wave generator system with optimum conversion of wave action to electrical energy.

While there has been shown and described a preferred embodiment, it is to be understood that various other adaptations and modifications may be made within the spirit and scope of the invention.

What I claim is:

1. Apparatus for converting the energy of wave or current motion into electrical energy, comprising:
   a buoyant vessel adapted to be rocked by passing waves, said vessel being of a cylindrical configuration with a cylindrical sidewall and an upper surface and a lower surface;
   rail means secured to the interior of said sidewall and extending about the periphery thereof in a plane in proximate relation to said upper surface;
   pylon means secured within said vessel and having a rotatable shaft means on the axial centerline of the cylindrical sidewall;
   arm means having one end thereof secured to said shaft means, said arm means extending in a direction generally perpendicular to the axis of said shaft means;
   weight means secured to the other end of said arm means;
   wheel means at the other end of said arm means for engagement with said rail means; and
   hydraulic pump means adjacent the lower surface of the interior of said vessel and operable in response to movement of said shaft means; and
   other means including electrical power generating means for providing electrical energy, at least in part, in response to operation of said pump means.

2. The apparatus of claim 1 wherein said other means includes a hydraulic motor coupled for driving said electrical power generator means.

3. The apparatus of claim 2 wherein said other means further includes reservoir means for containing hydraulic fluid, and accumulator means, said hydraulic pump means, said reservoir means and said accumulator means being connected in fluid flow relation for transferring fluid from said reservoir means through said pump means, and through said accumulator means for driving said hydraulic motor.

4. The apparatus of claim 3 wherein said accumulator means is a two stage accumulator.

5. The apparatus of claim 1 wherein said hydraulic pump means is operable with any direction of movement of said shaft means.

6. The apparatus of claim 1 wherein said rail means includes a rail member in proximate relation to said sidewall, and wherein said wheel means are disposed beneath said weight means in general alignment with the center of gravity of said weight means.

7. The apparatus of claim 6 wherein said rail member is of generally tubular configuration and said wheel means includes a wheel member with a cylindrical portion in generally point contact with said rail member.

8. The apparatus of claim 7 wherein said weight means includes a generally cubically configured weight member secured to said arm means with the center of gravity of said weight member passing through the axis of rotation of said wheel member.

9. The apparatus according to claim 1 wherein said vessel includes means for mooring said vessel and ruder means.

10. Apparatus for converting the energy of wave or current motion into electrical energy, comprising:
    a buoyant vessel adapted to be rocked by passing waves, said vessel being of a cylindrical configuration with a cylindrical sidewall having an axial centerline, said vessel having an upper surface and a lower surface;
    rail means secured to the interior of said sidewall and extending about the periphery thereof;
    weight means, including a weight and a rotatable shaft on the axial centerline, said weight being positioned for movement on said rail means in response to rocking of said vessel; and
    hydraulic pump means adjacent the lower surface of the interior of said vessel and operable in response to movement of said shaft; and
    other means including electrical power generating means for providing electrical energy, at least in part, in response to operation of said pump means.

11. The apparatus according to claim 10 wherein said vessel includes means for mooring said vessel and rudder means for at least in part controlling the orientation of said vessel relative to the wave direction.

12. The apparatus according to claim 10 wherein said rail means includes a rail member concentrically positioned relative to said sidewall and said weight means includes a weight member having wheel means in rolling contact with said rail member.

13. The apparatus according to claim 12 wherein said rail member lies in a plane in proximate relation to said upper surface.

14. The apparatus according to claim 13 wherein said wheel means include a wheel member in contact with said rail member and wherein said weight means includes an arm coupled to said shaft and said weight member is positioned on the end of said arm with the center of gravity of said weight member passing through the axis of rotation of said wheel means.

15. The apparatus of of claim 10 wherein said other means includes a hydraulic motor coupled for driving said electrical power generator means.

16. The apparatus of claim 15 wherein said other means further includes reservoir means for containing hydraulic fluid, and accumulator means, said hydraulic pump means, said reservoir means and said accumulator means being connected in fluid flow relation for transferring fluid from said reservoir means through said pump means, and through said accumulator means for driving said hydraulic motor.

17. The apparatus of claim 16 wherein said accumulator means is a two stage accumulator.

18. The apparatus of claim 10 wherein said hydraulic pump means is operable with any direction of movement of said shaft means, and wherein said other means includes a hydraulic motor actuated by said pump means for driving said electrical power generator means.

19. A method for converting the energy of wave or current motion into electrical energy, said method comprising:
- positioning a buoyant vessel for rocking by passing waves, said vessel being of a cylindrical configuration with a cylindrical sidewall and an upper surface and a lower surface;
- providing a rail member on the interior of said sidewall extending about the periphery thereof in a plane in proximate relation to said upper surface;
- supporting a weight member on said rail member for oscillation in response to rocking of said vessel;
- actuating hydraulic pump means within said vessel in response to oscillation of said weight member;
- accumulating hydraulic fluid under pressure from said hydraulic pump means within accumulator means;
- actuating hydraulic motor means with the accumulated fluid pressure within said accumulator means; and
- operating electrical power generating means within said vessel from said hydraulic motor means.

* * * * *